C. KIEREN.
MACHINE FOR MAKING TWINE.
APPLICATION FILED AUG. 29, 1907.

939,268.

Patented Nov. 9, 1909.
4 SHEETS—SHEET 1.

WITNESSES.

INVENTOR.

C. KIEREN.
MACHINE FOR MAKING TWINE.
APPLICATION FILED AUG. 29, 1907.

939,268.

Patented Nov. 9, 1909.
4 SHEETS—SHEET 3.

WITNESSES.

INVENTOR
Conrad Kieren
By Benedict, Morsell & Caldwell
ATTORNEYS.

UNITED STATES PATENT OFFICE.

CONRAD KIEREN, OF APPLETON, WISCONSIN.

MACHINE FOR MAKING TWINE.

939,268.  Specification of Letters Patent.  Patented Nov. 9, 1909.

Application filed August 29, 1907. Serial No. 390,575.

*To all whom it may concern:*

Be it known that I, CONRAD KIEREN, residing in Appleton, in the county of Outagamie and State of Wisconsin, have invented new and useful Improvements in Machines for Making Twine, of which the following is a description, reference being had to the accompanying drawings, which are a part of this specification.

My invention has relation to improvements in machines for making twine, being more particularly intended for making or forming twine from a sedge (*Carexstructa*), which is commercially, although incorrectly, called "grass twine."

The invention has for one of its important objects, the provision of a more simple form of machine of this character than has heretofore been produced, not only with respect to construction of parts, but also with respect to operation.

A further important object is the provision of an improved form of feeding mechanism, whereby every length of sedge or grass which is fed into the machine is carried along the machine and formed into twine, in contradistinction to machines as heretofore constructed in which only a portion of the material fed into the machine is carried along said machine and formed into twine, the remaining portion or surplus crowding out through one side of the machine.

With the above primary, and other incidental, objects in view, the invention consists of the devices and parts, or the equivalents thereof, as hereinafter fully set forth.

In the accompanying drawing, Fig. 7 is a view of the rear portion of the frame at the feed end of the machine, showing clearly the feed roll and its coöperating belt, together with the means for adjusting said belt, the gearing to the rear of the feed roll and belt being omitted; Fig. 8 is a section on the line 8—8 of Fig. 7; Fig. 9 is a side view of the draw roll mechanism; Fig. 10 is an end view thereof; Fig. 11 is a view of the bracket which is provided with the lower guide member which leads to the feed roll and belt; and, Fig. 12 is a cross section on the line 12—12 of Fig. 11.

Referring to the drawings, the numeral 13 indicates the frame portion of the machine at the feed end thereof, and 14 a rear extension therefrom. This framework may be of any desirable construction best adapted for supporting the operative parts, although the form shown in the accompanying drawings is a desirable one.

Figure 1:
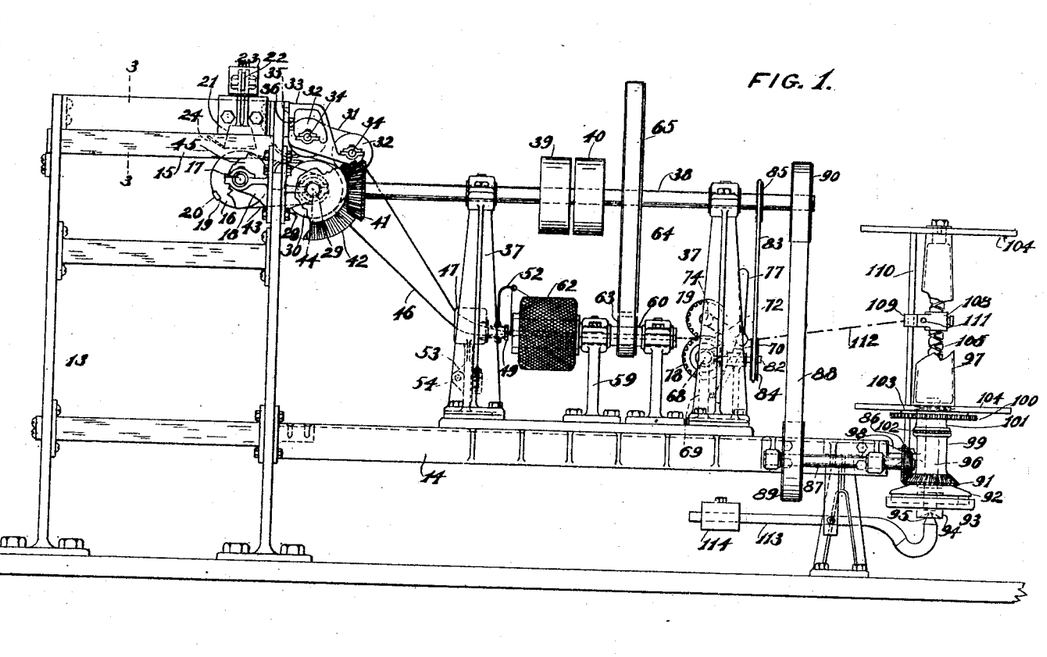
Figure 1 is a side elevation of the machine, parts broken away.
Figure 2:
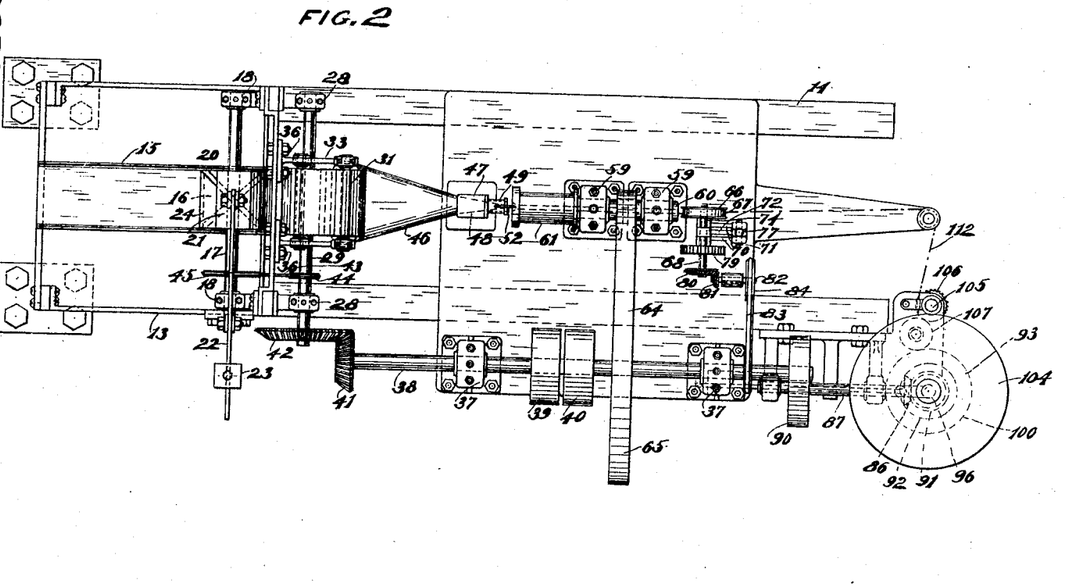
Fig. 2 is a plan view of Fig. 1.

The feed way 15, preferably in the form of a trough, extends longitudinally and centrally of the upper portion of the frame 13, and the lengths of material to be formed into twine are placed longitudinally in the trough. The forward portion of the bottom of this trough is open, as most clearly shown in Fig. 1, and a gripping roller 16 extends through this opening a slight distance above the plane of the bottom of the trough. This roller is mounted on a shaft 17 disposed beneath the upper portion of the bottom of the trough, said shaft being mounted in suitable bearings 18. In order to afford to the roller 16 the best gripping capability, I prefer to provide the periphery of said roller with a spiral groove 19, which groove is filled with emery stone 20, said stone projecting a slight distance outwardly beyond the periphery of the roll.

Mounted within the feed way or trough, just above the roller 16, is a weight 21. This weight is pivotally carried at one end of a medially fulcrumed lever 22, the free end of said lever carrying an adjustable weight 23. A deflecting plate 24 extends from the outer side of the lower edge of the weight 21, at an upward outward incline. This plate is sufficiently wide to substantially fill the width of the trough, and acts as a guide for deflecting the lengths of material under the weight, or, in other words, between the weight and the roller 16.

Just to the rear of the roller 16 and weight 21 are two guide plates 25 and 26, the upper plate 25 being secured to the frame and extending downwardly, and the lower plate extending centrally from and preferably rigid with a metallic cross strip 27, the latter having its ends secured to the uprights of the frame 13. The two plates 25 and 26 are curved toward each other, so as to form a gradually narrowing or contracting passage or throat extending rearwardly from the frame 13.

Figures 7, 8, 9, 10, 11, 12:
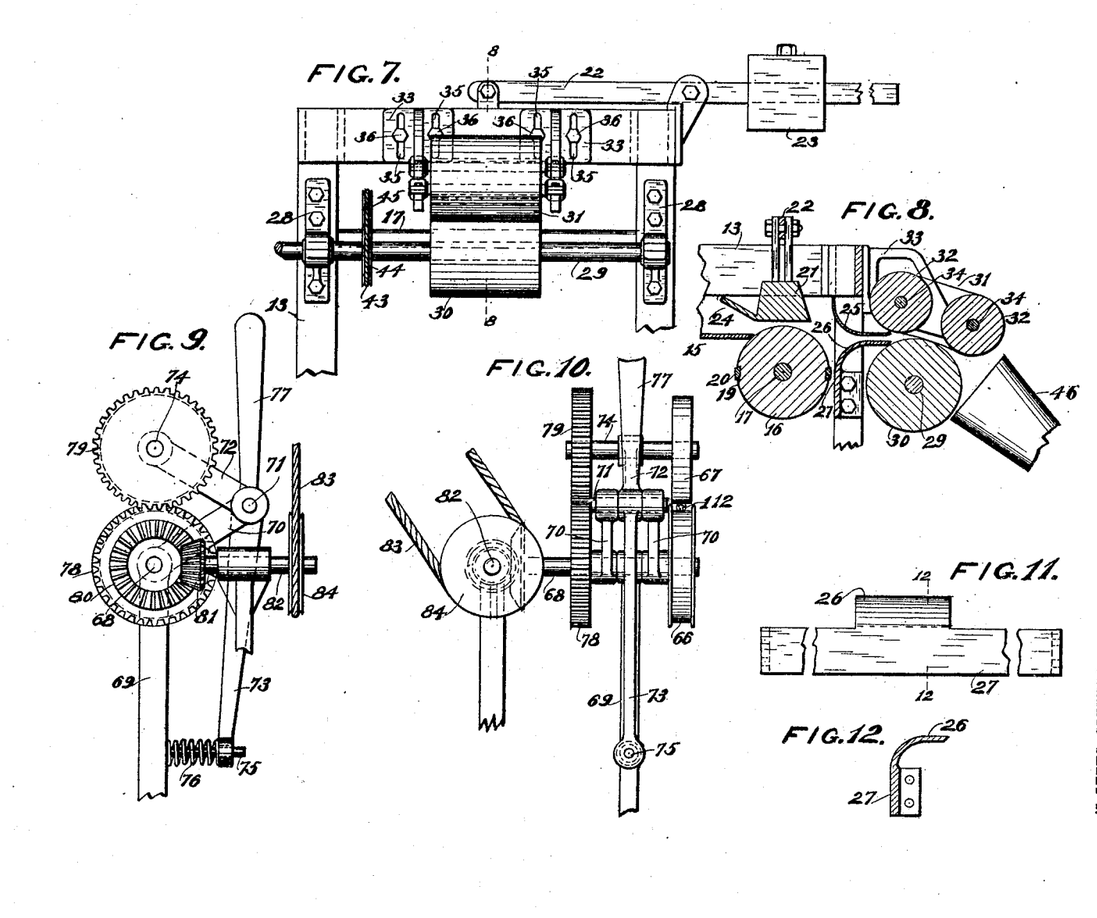

Mounted in bearings 28 projecting rearwardly from the uprights of frame 13 is a shaft 29. Mounted centrally on this shaft, and rotatable therewith, is a feed roll 30. Above feed roll 30 is a coöperating endless belt 31, which passes around rollers 32—32. These rollers are preferably idle, and movement is imparted to the belt by direct contact of said belt with the feed roller 30. In order to always insure this contact, and to regulate the degree of contact, I prefer to provide for an adjustment of the belt toward and from the roller 30. To this end, I employ two brackets 33—33 in which the shafts 34—34 of the rollers 32 are mounted. Each bracket is provided with elongated slots 35—35 through which screws 36—36 pass and enter the framework. It is obvious that by loosening the set screws, the brackets may be adjusted upwardly or downwardly, in order to obtain the proper contact of the belt with the roller.

Extending upwardly from the platform of the frame 14, near one of the side edges of said platform, are two standards 37—37, the upper ends thereof forming bearings for a shaft 38. This shaft has mounted thereon fast and loose pulleys 39 and 40, around which a belt (not shown) leading from any suitable source of power is adapted to pass. When the shaft is adjusted over the fast pulley, rotation is imparted to the shaft 38. The forward end of shaft 38 is provided with a beveled pinion 41, which meshes with a beveled gear 42 on one end of shaft 29, and consequently drives shaft 29. Shaft 17 is driven from shaft 29 by means of an endless belt 43 passing around a pulley 44 on shaft 29, and around a similar pulley 45 on shaft 17.

Immediately to the rear of feed roll 30 and belt 31, and extending downwardly at a decline, is a chute 46, which gradually narrows or tapers toward and to its lower discharge end.

In line with the discharge end of the chute is a block 47 which is provided therethrough with a tapering passage 48 into which passage the discharge end of the chute extends for a slight distance. From the fact that both the chute and the passage 48 taper, the material passing therethrough is necessarily compressed and forced together as it seeks its outlet from the discharge end of the passage.

A tension carrier 49, also provided with a tapering passage 50, is secured to the rear side of block 47 at such position that its passage 50 will be in line and register with the passage 48. The tension carrier is provided with enlarged ends and mounted loosely on the carrier between said ends is a collar 51, to which a spring tension arm 52 is connected. The collar is preferably formed of semicircular sections connected together by means of bolts engaging registering openings in lugs extending from the respective sections of the collar.

Figures 3, 4, 5, 6:
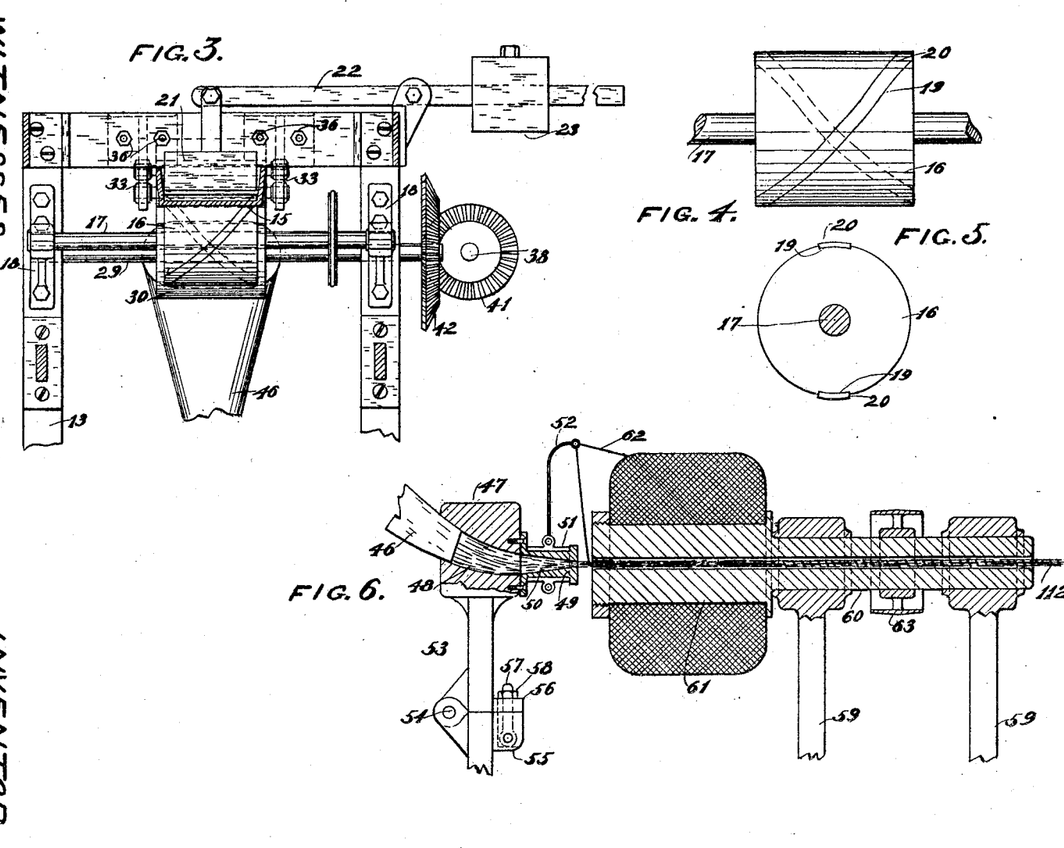
Fig. 3 is a cross section on the line 3—3 of Fig. 1.
Fig. 4 is a view of the gripping roller.
Fig. 5 is an end view of Fig. 4.
Fig. 6 is a longitudinal section through the twine wrapping mechanism.

The block 47 is formed at the upper end of a standard 53 which rises upwardly from the platform or bed of the frame 14. This standard is preferably composed of two sections hinged together, so as to enable the upper section thereof to be swung to the left (Fig. 6) and thereby permit the wrapping thread, hereinafter referred to, to be readily placed on or removed from the spool. The hinge of the standard is indicated by the numeral 54, and on the edge of the standard opposite to the edge where the hinge is provided, are two lugs 55 and 56, the lug 55 projecting from the lower section of the standard and the lug 56 from the upper section of said standard. When the upper section of the standard is in perpendicular alinement with the lower section the lug 56 is seated upon lug 55. In order to releasably lock the two sections of the standard in their normal perpendicularly alined position, I provide registering recesses in the two lugs 55 and 56, as shown by dotted lines in Fig. 6, and pivot in the recess of the lower lug 55 a bolt 57, which extends up through the recess of the upper lug 56, and has its extremity above said lug threaded to receive a nut 58. Whenever it is desired to swing the upper section of the standard on its hinge, the nut 58 is removed, and the bolt 57 turned outwardly.

To the rear of the tension mechanism is the wrapping mechanism. Referring to this, the numerals 59—59 indicate uprights or standards rising upwardly from the base of the frame 14, the upper ends thereof forming bearings for a tubular shaft 60, said shaft being formed or provided at one end with a spool 61 upon which the wrapping thread 62 is carried. The outer head of this spool has a threaded engagement with the outer end of the spool, as clearly shown in Fig. 6, so as to provide for the removal of said head, whenever it is desired to place a new supply of thread on the spool. To accomplish the removal, the nut 58 hereinbefore referred to, is turned off the bolt 57, and said bolt turned outwardly on its pivot. The upper section of the standard 53 is then free to be swung outwardly on its hinge. When this is done, the outer head of the spool is turned off, and the ball or winding of thread is readily removable from the spool.

The tubular shaft 60 may be rotated in any desirable manner, but I prefer to mount on said shaft a pulley 63 around which a belt 64 passes, said belt also passing around a large pulley 65 mounted on the shaft 38.

It will be understood that the bore of shaft 60 is in alinement with the passage 50 of the tension carrier 49, so that the lengths of material can pass directly from the tension carrier into the bore of the shaft. It will also be understood, and as clearly shown in the drawings, that the free end of the thread 62 is carried into engagement with the hook at the free end of the spring tension arm 52, and is then continued downwardly and initially wrapped around the lengths of material.

To the rear of the wrapping mechanism are arranged two draw rolls for drawing or pulling the wrapped twine rearwardly. The lower of these rolls, indicated by the numeral 66, is provided with a grooved periphery, and the upper of said rolls, indicated by the numeral 67, fits between the flanges which form the groove of the lower roll (see particularly Fig. 10 of the drawing.) The lower roll 66 is mounted on and rotates with a short shaft 68, said shaft having its bearing at the upper end of an upright 69. Also on shaft 69 are two arms 70—70. These two arms are pivotally connected by a pivot pin 71 to a bell crank lever, the upper short arm 72 of said lever extending forwardly at an upward incline, and the lower arm 73 extending downwardly in a substantially straight line. The upper arm 72 of the bell crank lever forms a bearing for the shaft 74 of the upper roll 67, the said shaft turning freely in its bearing. The lower end of the lower arm 73 of the bell crank lever is provided with an opening, and through this opening passes a pin 75 extending laterally from the upright 69. This pin is surrounded by a coiled spring 76, said pin being confined between the upright 69 and the lower end of arm 73, and normally forcing the lower arm 73 outwardly. The normal position of the two draw rolls 66 and 67 is clearly illustrated in Fig. 10 of the drawings, said figure also illustrating the wrapped twine extending between said rolls. The upper roll is held in this normal position by gravity, and by the expansive force of the spring 76. It is necessary at the beginning of the operation of the machine to pass the twine between the rolls 66 and 67. To accomplish this, the upper roll is lifted by means of a handle 77, said handle extending upwardly from the angle of the bell crank lever. This handle is pulled rearwardly and the lower end of the bell crank lever is thereby thrust forwardly and the coiled spring 76 compressed. After the twine is passed between the rolls 66 and 67 the handle is released, and the recoil of the spring 76 restores the parts to their normal position, with the upper roll 67 coöperating with lower roll 66, as shown in Fig. 10.

Any suitable means may be provided for driving the two rolls 66 and 67, but I prefer to employ for the purpose a toothed wheel 78 mounted on the shaft 68, and an intermeshing toothed wheel 79 mounted on the shaft 74, and a beveled gear 80 at one end of shaft 68, meshing with a beveled pinion 81, mounted on a short shaft 82, said short shaft being rotated by means of an endless belt 83, passing over a pulley 84 on said short shaft, and also over a pulley 85 on shaft 38. It will be obvious, through the described means, that when the shaft 38 is rotated, rotation is also imparted to the lower shaft 68 of the draw roll mechanism, and through the intermeshing of the gears 78 and 79 an opposite rotation is imparted to the shaft 74 of the upper draw roll 67. From the fact that the upper roll 67 is held yieldingly against the lower roll 66, a downwardly yielding pressure is provided against the twine which passes between said roll, so that the upper roll is permitted to readily adjust itself to inequalities in the twine.

At the extreme rear of the machine is provided the mechanism for winding the finished product. Any desirable mechanism for this purpose may be employed, but I prefer to provide the mechanism illustrated in the accompanying drawing. Referring to this mechanism, the numeral 86 indicates a beveled pinion on the rear end of a longitudinally extending shaft 87. This shaft 87 is driven by means of an endless belt 88, passing around a pulley 89 on said shaft 87, and also around a pulley 90 on the shaft 38. The pinion 86 meshes with a beveled gear 91, and said gear 91 has formed rigidly with its under side a friction wheel 92. This friction wheel fits within, and its periphery engages, an annular upwardly extending flange of another friction wheel 93. The under side of friction wheel 93 is provided with a depending lug 94, the lower end of said lug being formed with a conical recess 95. The friction wheel 93 is feathered on an upwardly extending shaft 96, and this shaft extends to and is rigidly connected with one end of a winding drum 97. An arm 98 extends rearwardly from the framework 14, and the rear end of this arm is provided with a tubular sleeve 99 forming a bearing for the shaft 96, the said shaft rotating freely within the sleeve. Shaft 96 has mounted fast thereon, near the upper end thereof, a toothed wheel 100. The toothed wheel 100 is provided with a depending hub 101, and between the lower end of this hub and the upper end of the sleeve 99 are confined antifriction balls 102. The gear wheel 100 has an offset 103 formed on its upper face, which offset serves to space said wheel a desired distance from one of the end flanges or heads 104 of the drum.

A doubly and reversely screw threaded shaft or worm 105 forming a deployer is located directly at one side of the drum 97. This shaft 105 is rotated by means of gearing consisting of a toothed wheel 106 mounted on said shaft 105, and an intermediate toothed wheel 107 in mesh with said wheel 106 and with the toothed wheel 100. It will therefore be seen that when the shaft 96 is rotated not only is the drum rotated, but also this doubly and reversely screw threaded shaft. On the screw threaded shaft or deployer is a non-revoluble traveling guide 108, consisting of a band or ring fitted loose on the shaft, and provided with a suitable dog (not shown) for engaging the spiral grooves of said shaft. The guide is also provided with a projection 109, said projection provided with a vertical aperture through which aperture a guide rod 110 passes, the opening of the projection being large enough to permit the projection to be freely movable on the rod. The projection is also intersected by an opening 111 through which the end of the finished product or twine 112 passes. The fact that the projection 109 of the guide travels along the guide rod 110 prevents the guide from rotating on or with the worm. In the operation of this winding mechanism, as the worm or screw is rotated, the guide, by reason of the fact of its being prevented from rotating, will be caused to travel longitudinally of the worm, along said worm first in one direction and then in the other. It follows that the twine which passes through the projection of the guide and thence on to the drum will be regularly wound back and forth on the drum in succeeding layers, thus obviating any bunching of the twine together at any point of the drum.

In view of the fact that as the twine is wound upon the drum, the diameter of said drum is increased, it is necessary that there should be slippage of the drum, in order to compensate for this gradually increasing diameter, it being understood that the twine is always supplied in a regular and even quantity or amount. This is provided for by the friction wheels 92 and 93, which, while held in frictional contact will not slip except when the necessity above noted arises. When the necessity does arise, however, or, in other words, when the diameter of the drum is increased, it is necessary that said drum rotate at a slower rate of speed in order to take up the same amount of twine (said twine as before stated being always fed to the drum in a regular and even quantity). This is provided for, as previously stated, by the friction wheels 92 and 93, which, under the circumstances mentioned, slip and slow down the speed and thereby provide for the contingency mentioned. In order to automatically regulate the extent of the frictional contact of the two friction wheels, I provide a medially fulcrumed lever 113, said lever having its rear end upturned to engage in the recess 95 of the depending lug 94 of friction wheel 93. On the forward portion of this lever is adjustably mounted a weight 114. By changing the position of this weight on the lever, the extent of the pressure of the rear end of said lever against the depending lug 94 of friction wheel 93 may be conveniently regulated.

In the operation of the machine, rotation of course is first imparted to the shaft 38, in order to impart rotation and motion to the several movable parts of the mechanism. The lengths of material are placed in the trough or feed way 15, longitudinally of said trough or feed way, and their rear ends are acted upon by the gripping roller 16, and said lengths of material pulled in between the gripping roller and the weight 21. The deflecting plate 24 acts as a convenient means for forcing the lengths of material between the roller and weight, and the emery stone which is arranged spirally around roller 16 and projects slightly beyond the periphery of the roller aids material in the gripping action of said roller. As the material is thus pulled rearwardly, it next passes between draw roller 30, and belt 31 above said roller, and by the action of roller 30 and said belt, the lengths of material are drawn rearwardly into the chute 46, thence through the passages 48 and 50 of the block 47 and tension carrier 49 respectively, and thence into the bore of the spool carrying shaft 60. In the passage of the material through the chute, and through the tapering passages 48 and 50, the lengths of said material are necessarily brought together in compact form. The moment the rear ends of the compacted lengths of material enter the bore of the shaft 60 the thread 62 is carried down to the space between the forward end of the spool and the rear end of the tension carrier 49, and is initially wrapped around the compacted, but untwisted, lengths of grass. After this first initial winding of the thread, however, the said thread is automatically wound around the lengths of material, by reason of the rotation of the spool carrying shaft. When the wrapped twine emerges from the rear end of shaft 60, it is guided by hand into the grooved roller 66, and then the upper roll 67 is brought down to its normal position between the flanges of said grooved roll, and thereafter the two rolls 66 and 67 act to pull the wrapped twine rearwardly, and which wrapped twine is finally wound upon the drum 97 in the manner hereinbefore fully pointed out.

While in the foregong description, and in the drawings, I have illustrated my invention in connection with mechanism for compressing the lengths of the material together so as to form a compressed product, of straight or untwisted lengths of material, in contradistinction to a twisted product, yet it will be understood that the mechanism for carrying the lengths of material rearwardly, and compacting said lengths together, may be employed in connection with mechanism for not only wrapping the lengths of material with thread, but also for twisting said lengths together.

While I have herein shown and described certain details of construction, yet I do not wish to be understood, in all cases, as specifically limiting myself thereto, inasmuch as various modifications may be resorted to without departing from the spirit and scope of my invention.

One of the important features of my invention which I desire to emphasize is the feeding mechanism at the feed end of the machine, whereby every length of material placed in the feed way or trough is carried along the machine and formed into twine. As previously pointed out, in machines of this character as heretofore constructed only a portion of the material is carried along and formed into twine, while the surplus, or such of the lengths of material as have not been gripped and carried along the machine, are crowded out of the side of the machine.

Another important point of my invention is the specific arrangement of the tension mechanism. Heretofore in twine forming machines of the character to which this invention relates, the tension collar from which the tension arm projects is carried on and rotates with a separate tension shaft running through the spool carrying shaft. In my improved arrangement the collar 51 from which the spring tension arm 52 extends is mounted loosely on the block 49, and this block projects from and is rigidly connected to the block 47. By this provision, not only is the necessity of a separate tension carrying shaft obviated, but furthermore the thread is seldom broken, as was previously frequently the case, and said thread is always kept at the same tension, whereas in the old construction the tension of the thread was variable.

What I claim as my invention is:

1. In a machine for making twine, the combination with a feed way or holder for the material, of a rotatable roller beneath and projecting through an opening in the bottom of said feed way or holder, and a non-rotating reacting member above the roller coöperating with said roller in gripping the lengths of material deposited in the feed way or holder, and pulling all of the lengths of said material lengthwise along and through the feed way or holder.

2. In a machine for making twine, the combination with a feed way or holder for the material, of a rotatable roller beneath and projecting through an opening in the bottom of said feed way or holder, and a weight suspended above the roller and coöperating with said roller in gripping the lengths of material deposited in the feed way or holder and pulling said lengths of said material along and through the feed way or holder.

3. In a machine for making twine, the combination with a feed way or holder for the material, of a rotatable roller beneath and projecting through an opening in the bottom of the feed way or holder, and a weight suspended above the roller and coöperating with said roller in gripping the lengths of material deposited in the feed way or holder and pulling the lengths of said material along and through the feed way or holder, said weight provided on its forward side with a deflecting plate projecting upwardly from the lower edge of said forward side of the weight.

4. In a machine for making twine, the combination of a feed way or holder for the material, a rotatable roller beneath and projecting through an opening in the bottom of the feed way or holder, a weight above the roller and coöperating with said roller in gripping the lengths of material deposited in the feed way or holder and pulling the lengths of said material along and through the feed way or holder, a medially fulcrumed lever having one end pivotally connected to the weight, and a weight mounted on the opposite end of the lever.

5. In a machine for making twine, the combination of a feed way or holder for the material, a rotatable roller beneath and projecting through an opening in the bottom of the feed way or holder, a weight above the roller and coöperating with said roller in gripping the lengths of material deposited in the feed way or holder and pulling the lengths of said material along and through the feed way or holder, a medially fulcrumed lever having one end pivotally connected to the weight, and a weight adjustably mounted on the opposite end of the lever.

6. A gripping roller for a twine making machine, said roller provided peripherally with a trending rib of abrading substance and forming the gripping surface of the roller.

7. A gripping roller for a twine making machine, said roller provided peripherally with a spirally trending rib of emery stone, the said rib forming the gripping surface of the roller.

8. A gripping roller for a twine making machine, said roller provided peripherally with a spirally trending rib of abrading substance projecting beyond the periphery of the roller, said rib forming the gripping surface of said roller.

9. A gripping roller for a twine making machine, said roller provided peripherally with a spirally trending groove, said groove filled with an abrading substance forming a spiral gripping rib.

10. A gripping roller for a twine making machine, said roller provided peripherally with a spirally trending groove, said groove filled with an abrading substance forming a spiral gripping rib, the said rib projecting beyond the periphery of the roller.

11. In a machine for making twine, the combination with a feed way or holder for the material, of a rotatable roller beneath and projecting through an opening in the bottom of said feed way or holder, said roller provided with a spirally trending rib formed of abrading substance, and mechanism above the roller and coöperating with said roller in gripping the lengths of material deposited in the feed way or holder and pulling the lengths of said material along and through the feed way or holder.

12. In a machine for making twine, the combination of a feed way or holder for the material, a rotatable roller beneath and projecting through an opening in the bottom of said feed way or holder, said roller provided peripherally with a spirally trending rib of emery stone, said rib forming the gripping surface of the roller, and mechanism above the roller and coöperating with said roller in gripping the lengths of material deposited in the feed way or holder and pulling the lengths of said material along and through the feed way or holder.

13. In a machine for making twine, the combination of a feed way or holder for the material, a rotatable roller beneath and projecting through an opening in the bottom of said feed way or holder, said roller provided peripherally with a spirally trending groove, said groove filled with an abrading substance forming a spiral gripping rib, and mechanism above the roller and coöperating with said roller in gripping the lengths of material deposited in the feed way or holder and pulling the lengths of said material along and through the feed way or holder.

14. In a machine for making twine, the combination of a feed way or holder for the material, a rotatable roller beneath and projecting through an opening in the bottom of said feed way or holder, said roller provided peripherally with a spirally trending groove, said groove filled with an abrading substance forming a spiral gripping rib, said rib projecting beyond the periphery of the roller, and mechanism above the roller and coöperating with said roller in gripping the lengths of material deposited in the feed way or holder and pulling the lengths of said material along and through the feed way or holder.

15. In a machine for making twine, the combination of a feed way or holder for the material, a rotatable roller beneath and projecting through an opening in the bottom of said feed way or holder, mechanism above the roller and coöperating with said roller in gripping the lengths of material deposited in the feed way or holder and pulling the lengths of said material along and through the feed way or holder, a roller to the rear of the feed way or holder, and yielding coöperating means above the latter roller adapted, in conjunction with said roller, to draw or pull the lengths of material out of the feed way or holder.

16. In a machine for making twine, the combination of a feed way or holder for the material, gripping means within the feed way or holder for pulling the lengths of material along and through said feed way or holder, a rotatable roller to the rear of the feed way or holder, yielding coöperating means above the roller adapted, in conjunction with said roller, to draw or pull the lengths of material out of the feed way or holder, and means for adjusting said coöperating means closer to or farther away from the roller.

17. In a machine for making twine, the combination of a feed way or holder for the material, gripping means within the feed way or holder for pulling the lengths of said material along and through the feed way or holder, a rotatable roller to the rear of the feed way or holder, an endless belt above and adapted to contact with the roller, and rollers around which said endless belt passes.

18. In a machine for making twine, the combination of a feed way or holder for the material, gripping means within the feed way or holder for pulling the lengths of the material along and through the feed way or holder, a rotatable roller to the rear of the feed way or holder, an endless belt above and adapted to contact with the roller, rollers around which the endless belt passes, and means for adjusting the latter rollers upwardly or downwardly in order to regulate the degree of contact of the belt.

19. In a machine for making twine, the combination of a feed way or holder for the material, gripping means within the feed way or holder for pulling the lengths of said material along and through the feed way or holder, guide plates to the rear of the gripping mechanism, said plates converging toward each other and forming a narrow or contracted passage, and yielding coöperating means above the roller adapted, in conjunction with said roller, to draw or pull lengths of material through and out of the passage formed by the guide plates.

20. In a machine for making twine, the combination of a non-rotatable member provided with a passage, said member also formed or provided with a projection having a passage therethrough in line and registering with the first referred to passage, a collar loosely mounted on said projection, a tension arm connected to and extending from the collar, means for feeding lengths of material into the registering passages, means for drawing the lengths of material through said passages, and means for wrapping a thread carried over the tension arm around the lengths of material.

21. In a machine for making twine, the combination of a non-rotatable member provided with a passage tapering toward its outlet or discharge end, said member also formed or provided with a projection having a tapering passage therethrough in line and registering with the first referred to tapering passage, a collar loosely mounted on said projection, a tension arm connected to and extending from the collar, means for feeding lengths of material into the registering tapering passages, means for drawing the lengths of material through said passages, and means for wrapping a thread carried over the tension arm around the lengths of material.

22. In a machine for making twine, the combination of a standard provided at its upper end with an enlargement having a passage therethrough, said standard being composed of two sections hinged together, means for releasably holding the two sections of the standard in perpendicular alinement with each other, said means when released permitting the upper section of the standard to be turned downwardly on its hinge, and a rotatable thread carrying shaft to the rear of the enlargement of the standard, the upper section of the standard when turned downwardly on its hinge, adapted to permit a ball or wrapping of thread to be inserted on to the end of the thread carrying shaft.

23. In a machine for making twine, the combination of a standard provided at its upper end with an enlargement having a passage therethrough, said standard being composed of two sections hinged together, recessed lugs projecting from the respective sections of the standard, the lug of the upper section adapted to seat itself upon the lug of the lower section, when the two sections are perpendicularly alined, a bolt pivoted in the recess of the lower lug and extending upwardly through the recess of the upper lug, a nut turned on to the upper extremity of the bolt, said nut when removed adapting the bolt to be turned outwardly, and thereby permitting the upper section of the standard to be turned outwardly and downwardly on its hinge, and a rotatable thread carrying shaft to the rear of the enlargement of the standard, the upper section of the standard, when turned downwardly on its hinge, permitting a ball or wrapping of thread to be inserted on to the end of the thread carrying shaft.

24. In a twine making machine, the combination of a non-rotatable member, a tension device loosely mounted on said member, said device provided with a projecting tension arm, and a rotatable thread carrying shaft having the thread carried thereby extended into engagement with the tension arm and thence carried downwardly in position to be wrapped around the lengths of material to be formed into twine.

In testimony whereof, I affix my signature, in presence of two witnesses.

CONRAD KIEREN.

Witnesses:
JAMES CLEMONS,
W. A. MOREY.